US010186737B2

(12) United States Patent
Iqbal et al.

(10) Patent No.: US 10,186,737 B2
(45) Date of Patent: Jan. 22, 2019

(54) TRACTION BATTERY INTEGRATED THERMAL PLATE AND TRAY

(71) Applicant: Ford Global Technologies, LLC, Dearborn, MI (US)

(72) Inventors: Asif Iqbal, Macomb, MI (US); James Lawrence Swoish, Northville, MI (US); Josef Dollison, Petersburg, MI (US); Jason Sielaff, Ann Arbor, MI (US); Daniel Miller, Dearborn, MI (US); Evan Mascianica, Detroit, MI (US); Jeremy Samborsky, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 15/434,292

(22) Filed: Feb. 16, 2017

(65) Prior Publication Data
US 2018/0233789 A1    Aug. 16, 2018

(51) Int. Cl.
*H01M 2/10* (2006.01)
*H01M 10/6554* (2014.01)
*H01M 10/625* (2014.01)
*H01M 10/6556* (2014.01)
*H01M 10/613* (2014.01)

(52) U.S. Cl.
CPC ....... *H01M 10/625* (2015.04); *H01M 2/1077* (2013.01); *H01M 10/613* (2015.04); *H01M 10/6554* (2015.04); *H01M 10/6556* (2015.04); *H01M 2220/20* (2013.01)

(58) Field of Classification Search
CPC .......... H01M 10/625; H01M 10/6554; H01M 10/6556; H01M 2/1077; H01M 10/613; H01M 2220/20
See application file for complete search history.

(56) References Cited

U.S. PATENT DOCUMENTS

| | | | | |
|---|---|---|---|---|
| 5,678,760 A | * | 10/1997 | Muso | B60K 11/02 165/41 |
| 6,355,318 B1 | * | 3/2002 | Tailor | B29C 66/49 138/109 |
| 7,851,080 B2 | | 12/2010 | Weber et al. | |
| 9,452,683 B2 | | 9/2016 | Jairazbhoy et al. | |
| 2011/0206967 A1 | | 8/2011 | Itsuki | |

(Continued)

*Primary Examiner* — Lisa S Park
(74) *Attorney, Agent, or Firm* — David B. Kelley; Brooks Kushman P.C.

(57) ABSTRACT

A vehicle traction battery assembly may include a traction battery and a battery tray. The traction battery is for powering a portion of an electrified vehicle. The battery tray is for supporting the traction battery and defines a coolant channel for distributing coolant in a first direction and a second direction. Battery cells of the traction battery are arranged with the battery tray such that the first direction and the second direction are oriented perpendicular relative to a longitudinal face of one of the battery cells. A plate may be secured to the battery tray without mechanical fasteners to retain coolant within the coolant channel. The plate may be made of aluminum and the battery tray may be die cast aluminum. An inlet channel may extend from an inlet to the coolant channel and may be disposed between a pair of openings defined by the battery tray.

18 Claims, 6 Drawing Sheets

(56) References Cited

U.S. PATENT DOCUMENTS

| | | | |
|---|---|---|---|
| 2012/0325447 A1* | 12/2012 | You | F28F 3/048 |
| | | | 165/170 |
| 2015/0140388 A1* | 5/2015 | Harada | H01M 10/617 |
| | | | 429/120 |
| 2015/0364730 A1* | 12/2015 | Glaspie | H01M 2/0285 |
| | | | 429/176 |
| 2016/0105998 A1* | 4/2016 | Lodholz | H05K 7/20254 |
| | | | 361/698 |

* cited by examiner

TRACTION BATTERY INTEGRATED THERMAL PLATE AND TRAY

TECHNICAL FIELD

This disclosure relates to assemblies to assist in thermal management of traction batteries of electrified vehicles.

BACKGROUND

Electrified vehicles such as battery-electric vehicles (BEVs), plug-in hybrid-electric vehicles (PHEVs) or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes a traction battery and a battery tray. The traction battery is for powering a portion of an electrified vehicle. The battery tray is for supporting the traction battery and defines a coolant channel for distributing coolant in a first direction and a second direction. Battery cells of the traction battery are arranged with the battery tray such that the first direction and the second direction are oriented perpendicular relative to a longitudinal face of one of the battery cells. A plate may be secured to the battery tray without mechanical fasteners to retain coolant within the coolant channel. The plate may be made of aluminum and the battery tray may be die cast aluminum. The plate may be brazed to the battery tray to prevent leakage of the coolant from the coolant channel. An inlet channel may extend from an inlet to the coolant channel and may be disposed between a pair of openings defined by the battery tray. Each opening may be sized to receive a portion of an electrical component. The coolant channel may include features to increase an effective area of surfaces of the coolant channel. A galvanized e-coated aluminum plate may be disposed between the traction battery and the battery tray. The battery tray may define an inlet and an outlet in fluid communication with the coolant channel and on a same side of the battery tray.

A vehicle traction battery assembly includes a traction battery, a battery tray, and an aluminum plate. The traction battery includes a plurality of battery cells for powering a portion of an electrified vehicle. The battery tray defines a coolant channel for coolant flow in a first direction and a second direction, an inlet channel to deliver coolant to the coolant channel, and a pair of openings each defined on opposing sides of the inlet channel for electrical connectors to extend through. The aluminum plate is disposed between the traction battery and the battery tray. The first and second directions are perpendicular relative to a longitudinal face of one of the battery cells of the traction battery. Each of the pair of openings may be spaced from the inlet channel such that coolant flowing through the inlet channel is in thermal communication with an electrical component for connecting to one of the electrical connectors. The battery tray may be die cast aluminum and brazed to the aluminum plate. The battery tray may be secured to the aluminum plate without mechanical fasteners. The electrical connectors may be for one of a BECM, a power electronics module, and a converter module. The perpendicular orientation of coolant flow in the first and second directions relative to a longitudinal face of one of the battery cells may increase heat rejection from the one of the battery cells.

A vehicle traction battery assembly includes a traction battery, an integrated component, and a galvanized aluminum plate. The traction battery is for powering a portion of an electrified vehicle. The integrated component operates as a thermal plate and a battery tray for a traction battery including a base portion defining a coolant channel to distribute coolant in a first and second direction and a sidewall extending about a perimeter of the tray to define a cavity for disposal of a portion of the traction battery. The galvanized aluminum plate is disposed between battery cells of the traction battery and the integrated component to prevent direct contact of the battery cells and coolant flowing within the coolant channel. Each battery cell of the traction battery may include a longitudinal face oriented perpendicular relative to the first direction and the second direction. The sidewall may extend from the base portion to a height at or above a mid-height of one of the battery cells. The galvanized aluminum plate may be secured to the integrated component without mechanical fasteners. The integrated component may be die cast and the galvanized aluminum plate may be brazed to the integrated component to prevent leakage of coolant flowing within the coolant channel.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
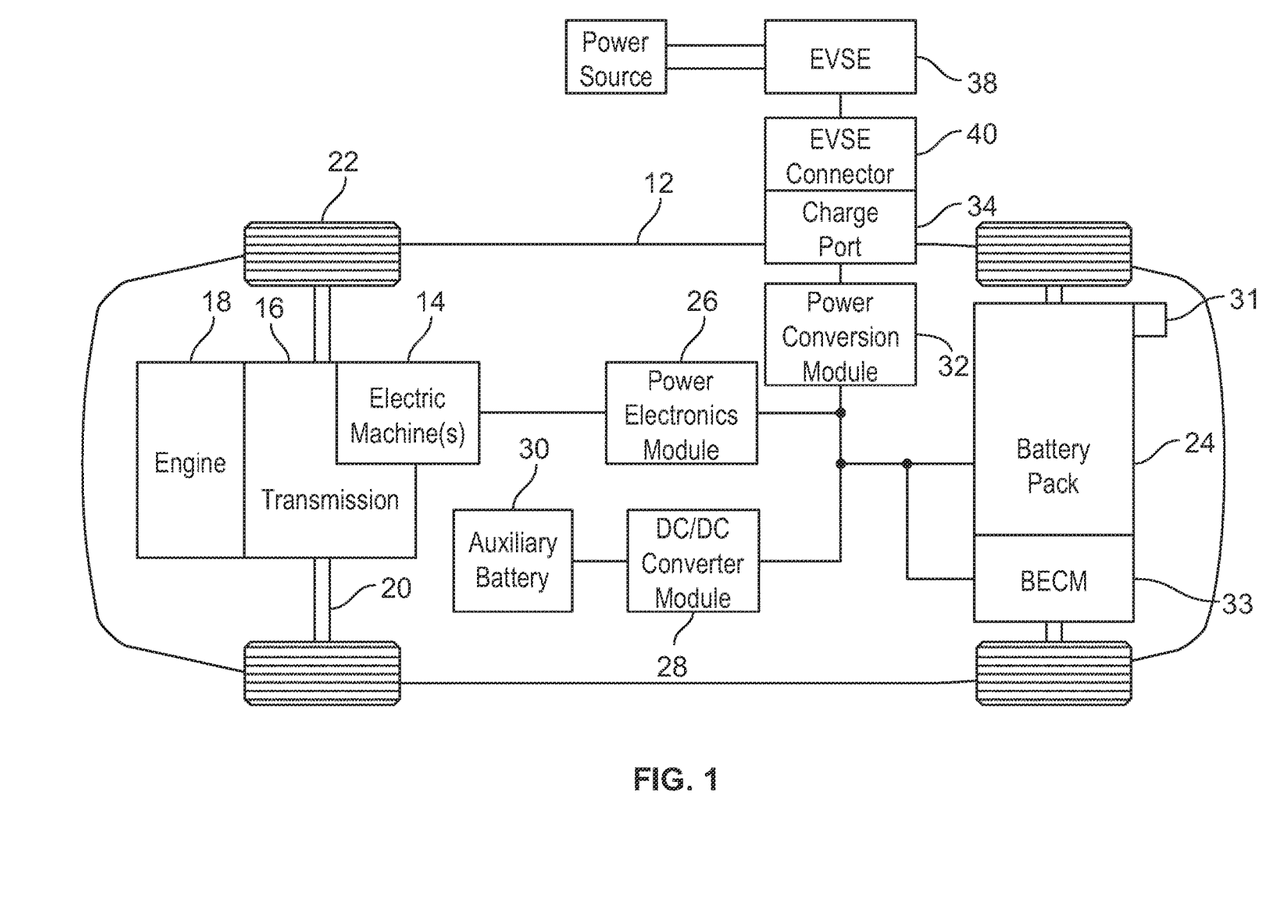
FIG. 1 is a schematic diagram of an example of an electrified vehicle.

FIG. 1 depicts an example of a schematic diagram for a PHEV. A vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 may be an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells of the traction battery 24, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the battery cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Prior examples of traction battery assemblies include thermal management systems. These thermal management systems may include multiple components including battery cells, a thermal plate, a thermal interface material, and a battery tray. Two examples of desired thermal plate deliverables may include extracting a maximum amount of heat from the battery cells and maintaining a substantially uniform temperature at a base of the battery cells. To achieve these deliverables, coolant is distributed to the thermal plate to manage thermal conditions of the battery cells. A reduction in a number of components may provide advantages in terms of performance and assembly.

Figure 2:
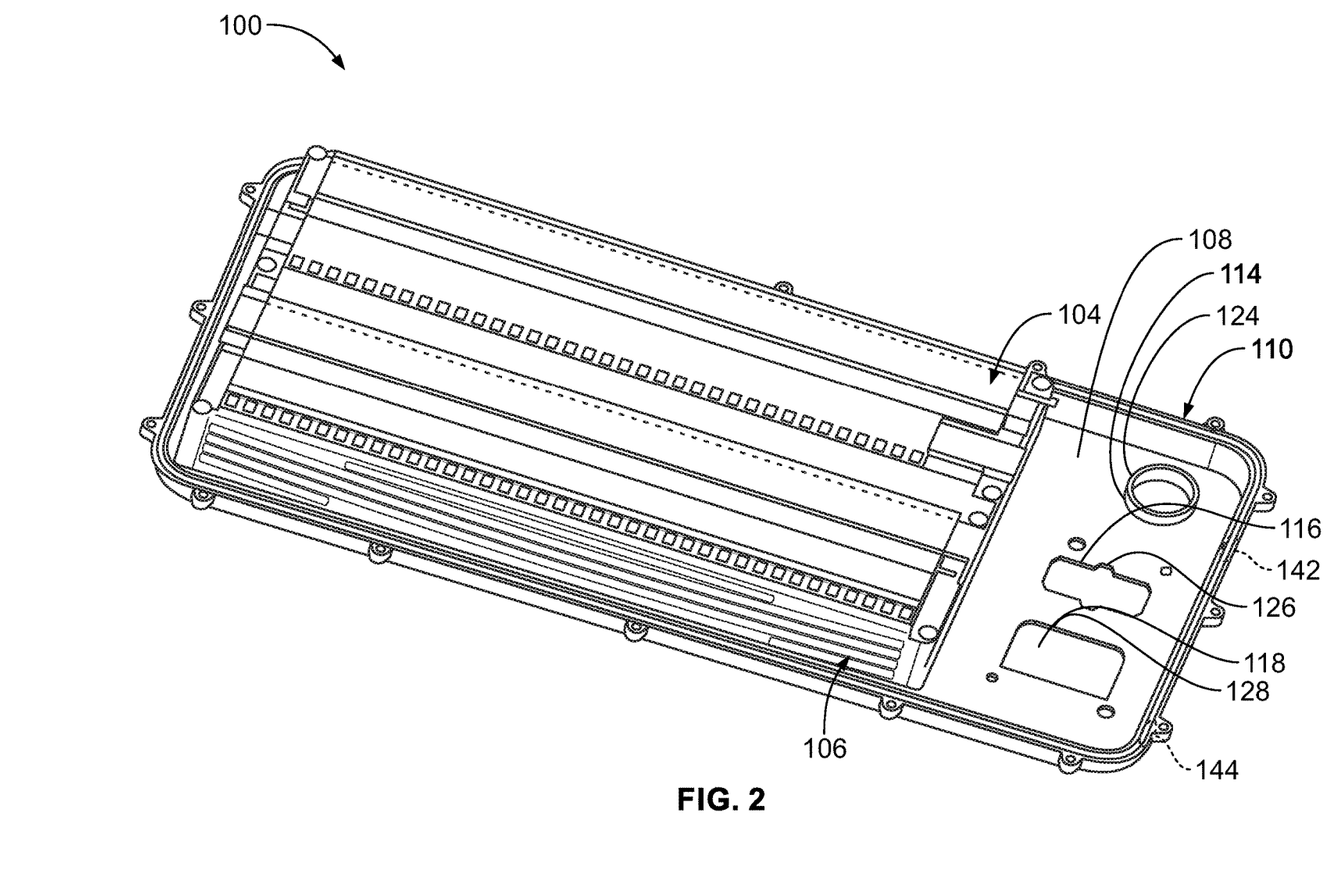
FIG. 2 is a perspective view of an example of a portion of a traction battery assembly.
Figure 3:
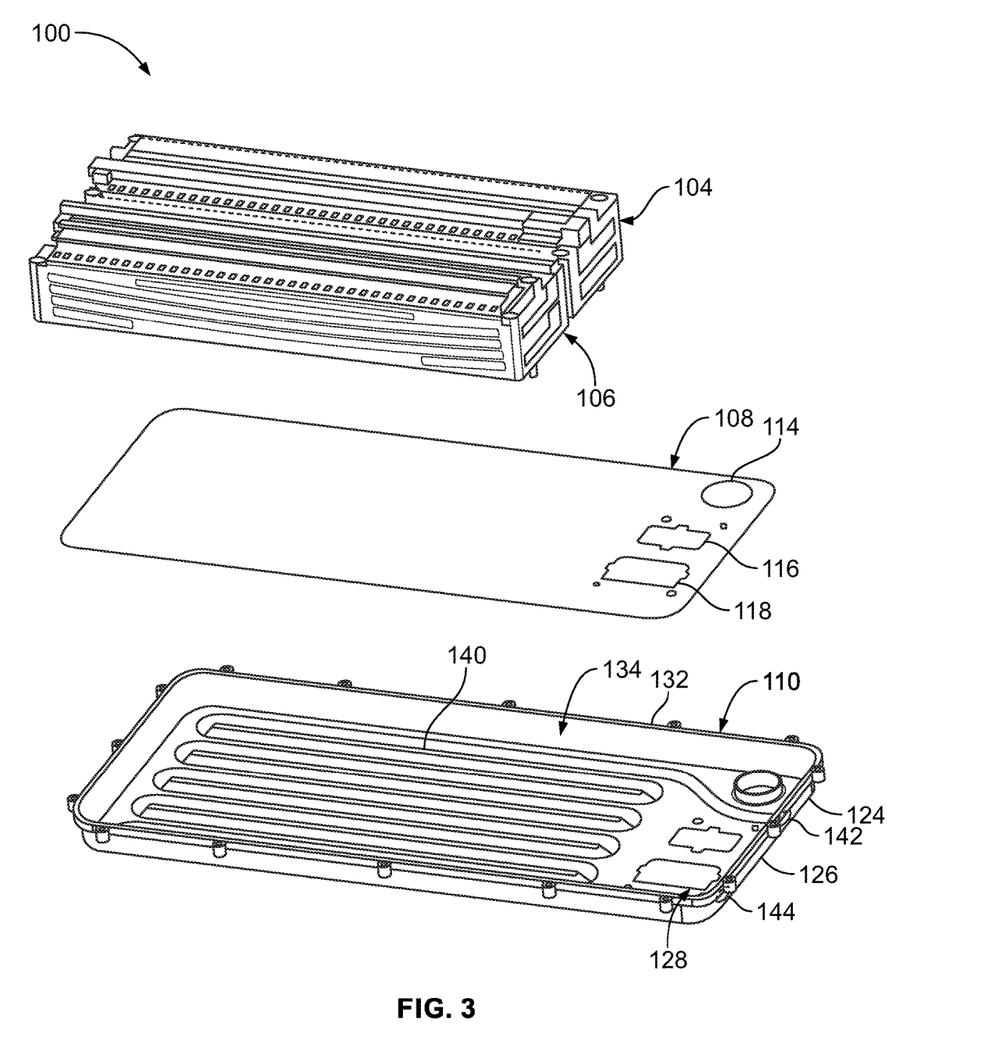
FIG. 3 is an exploded perspective view of the example of the portion of the traction battery assembly of FIG. 2.

FIGS. 2 and 3 show an example of a portion of a traction battery assembly, referred to generally as a traction battery assembly 100 herein. The traction battery assembly 100 may include a first battery cell array 104, a second battery cell array 106, a separator plate 108, and an integrated component 110. The integrated component 110 may operate as a thermal plate and a battery tray. For example, the integrated component 110 may define one or more channels for coolant to flow therethrough. The coolant may assist in managing thermal conditions of the first battery cell array 104 and the second battery cell array 106.

The first battery cell array 104 and the second battery cell array 106 may supply power to a portion of a vehicle. Each of the first battery cell array 104 and the second battery cell array 106 include a plurality of battery cells. The separator plate 108 and the integrated component 110 may each define openings sized to receive portions of electrical components or connectors for the electrical components. For example, the separator plate 108 may define a first opening 114, a second opening 116, and a third opening 118. Non-limiting examples of electrical components include a BECM, a power electronics module, a low voltage connector, and a converter module. The separator plate 108 may be galvanized e-coated aluminum. The separator plate 108 may operate to separate battery cells of the battery cell arrays from coolant flowing within coolant channels of the integrated component 110 as further described below.

The separator plate 108 may be e-coated and made of aluminum. The integrated component 110 may be die cast and made of aluminum. Inclusion of the separator plate 108 within the traction battery assembly 100 may eliminate a necessity for a thermal interface material disposed between the battery cell arrays and the coolant. The integrated component 110 may be secured to the separator plate 108 without mechanical fasteners. For example, the integrated component 110 may be brazed to the separator plate 108. The integrated component 110 may define a fourth opening 124, a fifth opening 126, and a sixth opening 128. The openings of the integrated component 110 may be aligned with the corresponding openings of the separator plate 108 for substantial registration with one another. A thickness of the separator plate may be between 2 millimeters and 4.0 millimeters.

The integrated component 110 may include a sidewall 132 extending about a perimeter thereof. The sidewall 132 may extend from a base portion of the integrated component 110 to a height at or above a mid-height of one of the battery cells of the first battery cell array 104 or the second battery cell array 106. The sidewall 132 may define a cavity 134 for disposal of at least a portion of the first battery cell array 104 and the second battery cell array 106. The sidewall 132 may define a slot 135 to receive a portion of a cover (not shown). The cover may be mounted to the integrated component 110 to retain the first battery cell array 104 and the second battery cell array 106 therein. A thickness of the integrated component 110 may be between 3.6 millimeters and 4.0 millimeters.

The integrated component 110 may define a coolant channel 140 for coolant to flow therethrough. The coolant channel 140 is shown having a tube-shape, however various shapes are available. The coolant channel 140 may define features (not shown) to promote turbulence in the coolant flowing therethrough and to increase an effective area of the coolant channel. Examples of the features include dimples, pedestals, or metal foam. The coolant channel 140, the first battery cell array 104, and the second battery cell array 106 may be arranged with one another such that coolant flowing through the coolant channel 140 is in thermal communication with the battery cells to assist in managing thermal conditions of the first battery cell array 104 and the second battery cell array 106. The coolant is delivered to the coolant channel 140 via an inlet 142 and exits the coolant channel 140 via an outlet 144. The inlet 142 and the outlet 144 may be defined by the sidewall 132 or a base portion of the integrated component 110. The inlet 142 and the outlet 144 are in fluid communication with each other via the coolant channel 140 and via a coolant return circuit (not shown).

Figure 4:
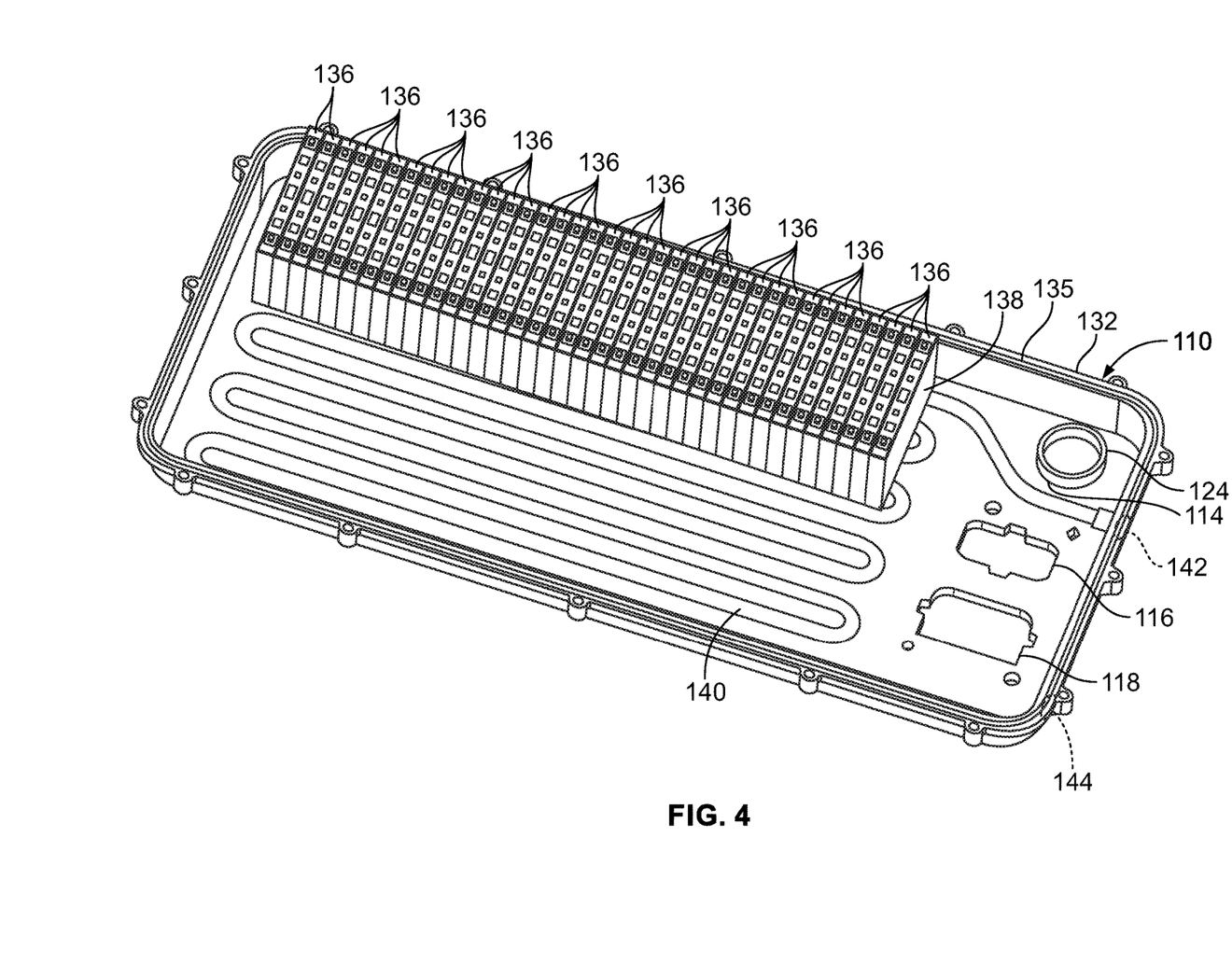
FIG. 4 is a perspective view of the example of the traction battery assembly of FIG. 2 with portions removed to show internal components.
Figure 5:
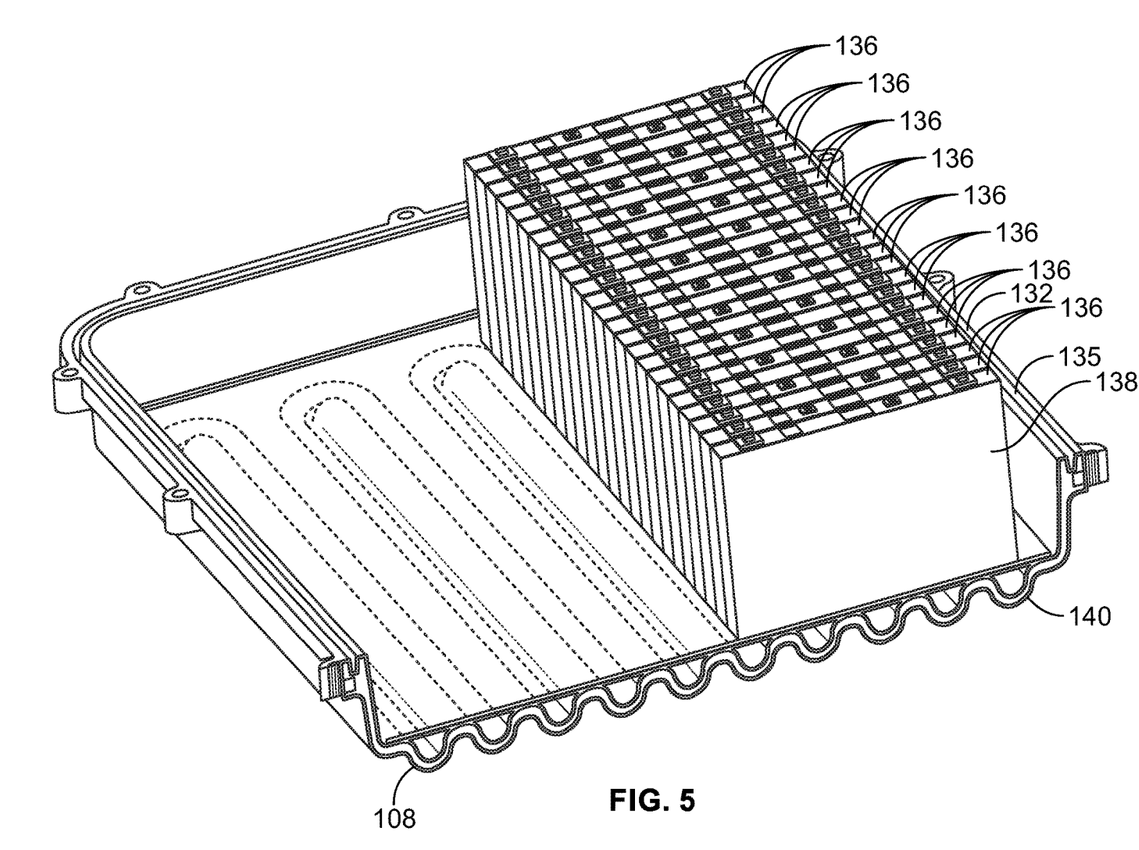
FIG. 5 is a perspective view, in partial cross-section, of a portion of the traction battery assembly of FIG. 2.

FIGS. 4 and 5 show further details of the traction battery assembly 100. Each of the first battery cell array 104 and the second battery cell array 106 include a plurality of battery cells 136. Each of the battery cells 136 includes a longitudinal face 138. Orientation of the battery cells 136 relative to the coolant channel 140 assists in managing thermal conditions of the battery cells 136. For example, the longitudinal faces 138 of the battery cells 136 are oriented perpendicular relative to a direction of coolant flow within the coolant channel 140 to increase heat rejection from the battery cells 136. This perpendicular coolant flow orientation provides a higher cooling capability for coolant flowing through the coolant channel 140.

Figure 6:
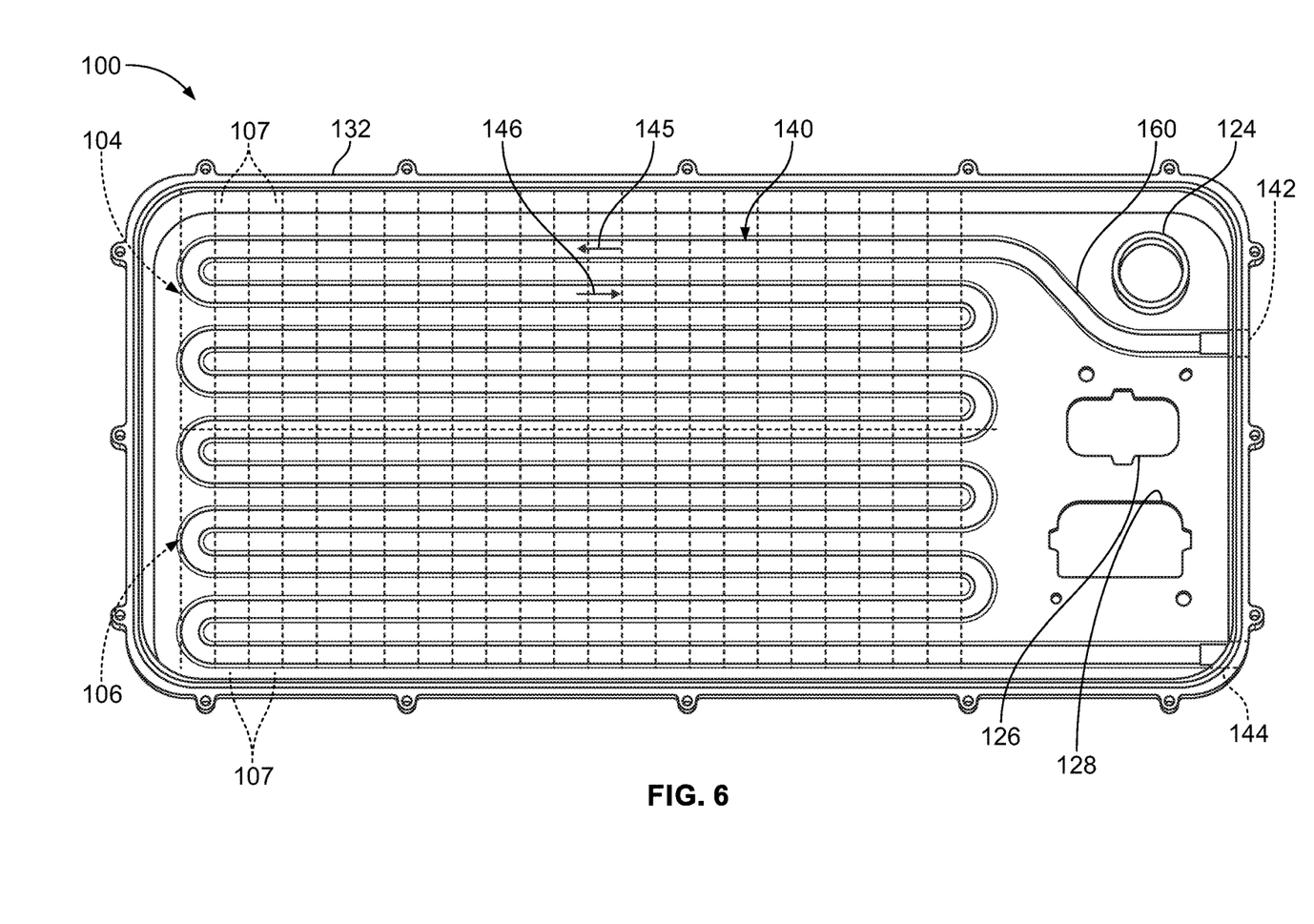
FIG. 6 is a plan view of a component of the traction battery assembly of FIG. 2.

FIG. 6 is a plan view of the integrated component 110. The coolant channel 140 is defined by the integrated component 110 such that coolant flows in a first direction (represented by arrow 145) and a second direction (represented by arrow 146). An inlet channel 160 extends from the inlet 142 to the coolant channel 140. The inlet channel 160 may be disposed between a pair of openings, such as the openings 114, 116, 124, and 126. Coolant within the inlet channel 160 may thus assist in managing thermal conditions of electrical components mounted near the inlet channel 160 by being in thermal communication therewith. A footprint of the first battery cell array 104 and the second battery cell array 106 is represented by a broken line in FIG. 6. The integrated component 110 and the battery cell arrays are arranged with one another such that the first direction and the second direction are substantially perpendicular relative to the longitudinal faces 138 of each battery cell 136. In this example, coolant flowing within the coolant channel 140 will make five passes of each battery cell 136. It is contemplated that the coolant channel 140 may be defined to include more or fewer passes of each battery cell 136.

The e-coating of the separator plate 108 may assist in preventing corrosion resulting from the coolant flowing within the coolant channel. Brazing the separator plate 108 to the integrated component 110 may assist in sealing the coolant channel 140 to prevent leakage of the coolant from the coolant channel 140. Further, brazing the separator plate 108 to the integrated component 110 eliminates a need for multiple fasteners and a seal which also makes an assembly process easier with fewer drilling requirements and fastener attachments, all of which may reduce a weight of the traction battery assembly and reduce assembly and component costs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   a traction battery including battery cells; and
   a battery tray defining an integrated inlet channel fluidly connected to a coolant channel for distributing coolant in first and second directions wherein the inlet channel is directly between a pair of electrical component openings without physically contacting the openings, wherein the cells are arranged with the battery tray such that the directions are oriented perpendicular relative to a cell longitudinal face.

2. The assembly of claim 1 further comprising a plate secured to the battery tray without mechanical fasteners to retain coolant within the coolant channel.

3. The assembly of claim 2, wherein the plate is made of aluminum and the battery tray is die cast aluminum, and wherein the plate is brazed to the battery tray to prevent leakage of the coolant from the coolant channel.

4. The assembly of claim 1, wherein each electrical component opening is sized to receive a portion of an electrical component.

5. The assembly of claim 1, wherein the coolant channel includes features to increase an effective area of surfaces of the coolant channel.

6. The assembly of claim 1 further comprising a galvanized e-coated aluminum plate disposed between the traction battery and the battery tray.

7. The assembly of claim 1, wherein the battery tray further defines an inlet and an outlet in fluid communication with the coolant channel and on a same side of the battery tray.

8. A vehicle traction battery assembly comprising:
   a traction battery including a plurality of battery cells for powering a portion of an electrified vehicle;
   a battery tray defining an integrated coolant channel for coolant flow in a first direction and a second direction and an inlet channel to deliver coolant to the coolant channel, wherein the inlet channel is disposed directly between and without physically contacting a pair of openings each defined on opposing sides of the inlet channel for electrical connectors to extend through; and
   an aluminum plate disposed between the traction battery and the battery tray,
   wherein the first and second directions are oriented perpendicular relative to a longitudinal face of one of the battery cells of the traction battery.

9. The assembly of claim 8, wherein each of the pair of openings is spaced from the inlet channel such that coolant flowing through the inlet channel is in thermal communication with an electrical component for connecting to one of the electrical connectors.

10. The assembly of claim 8, wherein the battery tray is die cast aluminum and brazed to the aluminum plate.

11. The assembly of claim 8, wherein the battery tray is secured to the aluminum plate without mechanical fasteners.

12. The assembly of claim 8, wherein the electrical connectors are for one of a battery electric control module, a power electronics module, and a converter module.

13. The assembly of claim 8, wherein the perpendicular orientation of coolant flow in the first and second directions relative to a longitudinal face of one of the battery cells increases heat rejection from the one of the battery cells.

14. A vehicle traction battery assembly comprising:
   a traction battery for powering a portion of an electrified vehicle;
   an integrated component for operating as a thermal plate and a battery tray for the traction battery and including a base portion defining a coolant channel to distribute coolant in a first and second direction and a sidewall extending about a perimeter of the integrated component to define a cavity for disposal of a portion of the traction battery, the base portion further defining an inlet channel in fluid communication with the coolant channel and disposed directly between two electrical component openings without physically contacting the openings; and
   a galvanized aluminum plate disposed between battery cells of the traction battery and the integrated component to prevent direct contact of the battery cells and coolant flowing within the coolant channel.

15. The assembly of claim 14, wherein each battery cell of the traction battery includes a longitudinal face oriented perpendicular relative to the first direction and the second direction.

16. The assembly of claim 14, wherein the sidewall extends from the base portion to a height at or above a mid-height of one of the battery cells.

17. The assembly of claim 14, wherein the galvanized aluminum plate is secured to the integrated component without mechanical fasteners.

18. The assembly of claim 14, wherein the integrated component is die cast, and wherein the galvanized aluminum plate is brazed to the integrated component to prevent leakage of coolant flowing within the coolant channel.

* * * * *